(12) United States Patent
Kurtz, Jr. et al.

(10) Patent No.: US 7,401,672 B2
(45) Date of Patent: Jul. 22, 2008

(54) RADIATOR MOUNTING SYSTEM

(75) Inventors: Robert D. Kurtz, Jr., Leola, PA (US); Braden G. Cammauf, Lititz, PA (US); Kevin W. Ward, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/805,027

(22) Filed: May 22, 2007

(65) Prior Publication Data

US 2007/0215400 A1 Sep. 20, 2007

Related U.S. Application Data

(62) Division of application No. 10/871,671, filed on Jun. 18, 2004, now Pat. No. 7,255,189.

(51) Int. Cl.
*B60K 11/04* (2006.01)
(52) U.S. Cl. .................... 180/68.4; 180/68.4; 180/68.1; 180/165; 180/54.1; 180/69.2
(58) Field of Classification Search ................ 180/68.4, 180/68.1, 165, 54.1, 69.2, 69.24
See application file for complete search history.

(56) References Cited

U.S. PATENT DOCUMENTS

| | | | |
|---|---|---|---|
| 3,297,080 A | 1/1967 | Williams et al. | |
| 3,334,704 A | 8/1967 | Gehrke et al. | |
| 3,743,045 A | 7/1973 | Hansen | |
| 3,834,478 A * | 9/1974 | Alexander et al. | 180/68.6 |
| 3,865,210 A | 2/1975 | Von Fummetti et al. | |
| 3,924,702 A * | 12/1975 | Heggen | 180/6.48 |
| 4,322,107 A | 3/1982 | Ishizuka et al. | |
| 4,369,855 A * | 1/1983 | Buschbom et al. | 180/212 |
| 4,371,048 A | 2/1983 | Hansen | |
| 4,415,052 A | 11/1983 | Gauer | |
| 4,541,645 A | 9/1985 | Foeldesi | |
| 4,641,721 A | 2/1987 | Yamaguchi | |
| 4,696,361 A * | 9/1987 | Clark et al. | 180/68.4 |
| 4,815,550 A * | 3/1989 | Mather et al. | 180/68.1 |
| 4,848,498 A | 7/1989 | Hart et al. | |
| 4,962,825 A * | 10/1990 | Albright et al. | 180/292 |
| 5,234,051 A | 8/1993 | Weizenburger et al. | |
| 5,492,167 A | 2/1996 | Glesmann | |
| 5,599,057 A | 2/1997 | Hirahara et al. | |
| 5,645,134 A | 7/1997 | Frankel et al. | |
| 5,676,197 A | 10/1997 | Diebold et al. | |
| 5,785,139 A | 7/1998 | Freedy et al. | |
| 5,947,540 A | 9/1999 | Pariseau et al. | |
| 6,058,903 A | 5/2000 | Downham | |
| 6,092,616 A | 7/2000 | Burris et al. | |
| 6,318,450 B1 | 11/2001 | Acre | |

(Continued)

*Primary Examiner*—Christopher Ellis
*Assistant Examiner*—Cynthia F Collado
(74) *Attorney, Agent, or Firm*—Michael G. Harms; John William Stader; Patrick M. Sheldrake

(57) ABSTRACT

A radiator mounting system for a skid steer vehicle includes an air box with a front wall having an opening sized to receive engine fan blades, an oil cooler disposed in the air box, a radiator; and a radiator frame supporting the radiator that is hingeably coupled to the air box. The radiator has plastic tanks and an aluminum core and the frame extends around the periphery of the radiator.

2 Claims, 11 Drawing Sheets

U.S. PATENT DOCUMENTS 6,405,825 B1 6/2002 Yabe et al.
6,648,088 B2 11/2003 Gabioli
6,655,486 B2 12/2003 Oshikawa et al.
6,663,166 B2 12/2003 Achleitner

* cited by examiner

RADIATOR MOUNTING SYSTEM

This divisional application claims priority under 35 U.S.C. § 120 from co-pending U.S. patent application Ser. No. 10/871,671 filed on Jun. 18, 2004, now U.S. Pat. No. 7,255,189 by Robert D. Kurtz Jr. et al. with the same title, the full disclosure of which is hereby incorporated by reference.

FIELD OF THE INVENTION

The present invention generally relates to work vehicles. More particularly, it relates to cooling systems for skid steer vehicles. Even more particularly, it relates to heat exchanger mounting arrangements including oil cooler and radiators.

BACKGROUND OF THE INVENTION

Skid steer vehicles such as skid steer loaders are a mainstay of construction work. In their most common configuration, they have two drive wheels on each side of a chassis that are driven in rotation by one or more hydraulic motors coupled to the wheels on one side and another one or more hydraulic motors coupled to the wheels on the other side.

The wheels on one side of the vehicle can be driven independently of the wheels on the other side of the vehicle This permits the wheels on opposing sides of the vehicle to be rotated at different speeds and in opposite directions. By rotating in opposite directions, the skid steer can rotate in place about a vertical axis that extends through the vehicle itself.

The vehicles have an overall size of about 10 by 12 feet, which, when combined with their ability to rotate in place, gives them considerable mobility at a worksite. It is this mobility that makes them a favorite.

Skid steer vehicles commonly have at least one loader (or lift) arm that is pivotally coupled to the chassis of the vehicle to raise and lower at the operator's command. This arm typically has a bucket, blade or other implement attached to the end of the arm that is lifted and lowered thereby. Most commonly, a bucket is attached, and the skid steer vehicle is used to carry supplies or particulate matter such as gravel, sand, or dirt around the worksite.

As a counterbalance to the loads provided at the front of the vehicle, skid steer vehicles typically have an engine that is located behind the operator. The radiator is also commonly disposed behind the operator, usually at the center rear of the vehicle behind the engine.

Cooling air for the engine is typically drawn into the rear engine compartment through an aperture protected by a grille or grating. This air aperture is most commonly disposed at the very rear of the vehicle. In the skid steer vehicle illustrated herein, for example, the air aperture is a rectangular opening that is located in a rear engine access door.

Skid steer vehicles are operated in dusty and dirty environments. The vehicles are typically used at construction sites for both roads and buildings. These environments are unpaved, and a significant amount of dirt gets stirred up by the passage of vehicles such as skid steers. Further, the method of steering—by skidding—breaks up compacted soil and turns it into loose particles easily lifted by wind and rotating wheels.

These environments cause significant dirt to accumulate around the radiator and other coolers. In skid steers this is a particular problem. They are close to the ground, they steer by skidding, and their cooling air intakes are located at the rear of the vehicle precisely where the wheels and the air disturbed during their passage throws us dirt and dust.

This accumulated dirt reduces the efficiency of the radiator and other coolers. Once sucked into the cooling air aperture, the dust coats the cooling fins of the engine cooling water radiator, oil coolers and other heat exchangers. Common skid steer vehicles have at least two heat exchangers that are cooled by this dirty air: an engine water cooler (or "radiator") and a hydraulic fluid cooler. As the air passes first through one, and then through the other, dirt, dust and other contaminants carried by the air begin to coat the cooling fins of each of the heat exchangers and plug the air flow passages between adjacent cooling fins. This coating blocks the transfer of heat from the cooling fins of the heat exchangers to the air and must be removed to restore the full operational capacity of the heat exchangers.

To restore efficiency it is necessary to clean the radiator and coolers out regularly. Cleaning the cooling fins requires a strong blast of air and/or water directed through the core of the heart exchangers. This blast of fluid must be of sufficient force to dislodge the dust dirt and other contaminants (small bits of paper, leaves, sticks twigs, etc.) that have lodged between or coat the cooling fins.

It is difficult to access the skid steer radiator and coolers and clean them. A single heat exchanger can be cleaned by directing a blast of air or water through both sides of the heat exchanger core. As long as the operator has access to both sides (both faces) of the heat exchanger it can be cleaned well.

When two heat exchangers are stacked and fastened one in front of the other, however, like two stacked slices of bread, the operator cannot reach both surfaces of the heat exchanger, only one surface (the outer surface) of each. A blast of fluid through two stacked heat exchangers is not satisfactory since the first heat exchanger core slows down, redirects and scatters the blast as it passes through, leaving little force to dislodge dirt, dust and contaminants from the second heat exchanger core.

The radiator and coolers cannot readily be separated to permit better cleaning. In the typical arrangement, the radiator and cooler are fixed to one another with metal straps and are together bolted to a fan shroud. The fan shroud is typically a large funnel-like structure, molded from a fiber reinforced plastic and fixed between the spinning engine fan that draws air through the heat exchangers and the heat exchangers themselves. Even small deflections or misalignments of such a fan shroud can cause it to be chewed up by the spinning fan blades, damaging both the fan and the shroud itself. Further, any disconnection or movement of the heat exchangers and the fan shroud with respect to each other run the risk of producing air leaks. Whenever air is permitted to leak out of or into the cooling air flow path without passing through the heat exchangers and the fan, the cooling air flow is reduced and the efficiency of the heat exchangers drops accordingly. For these reasons, the heat exchangers and the fan shroud are most commonly bolted firmly together and are fixed in place, with no easy provision for moving either heat exchanger.

What is needed, therefore, is an improved skid steer vehicle having a cooling system that is configured to provide better cleaning access. What is also needed is a system that provides access to the space between two stacked radiators. What is also needed is a system for providing access that is easily and quickly operated, without requiring considerably time for disassembly and reassembly. What is also needed is an improved system for sealing the heat exchangers in the radiator one to the other to reduce or eliminate air leaks. It is an object of this invention to provide these advantages. While not every claimed aspect of the invention provides all these advantages, each of these advantages is provided by at least one claimed aspect.

SUMMARY OF THE INVENTION

In accordance with a first aspect of the invention, a radiator mounting system for a skid steer vehicle is provided, including a rectangular air box having a front wall, a plurality of sidewalls abutting one another to form an air duct, and an open back, wherein the front wall has an opening sized to receive engine fan blades, a planar oil cooler disposed in the air box and having a plurality of lateral edges sealed against the plurality of sidewalls of the air box; a planar radiator having a plurality of lateral edges, a back side, and a front side; and a radiator frame supporting the radiator by its plurality of lateral edges, the frame including a strap configured to encircle and support the periphery of a radiator, wherein the strap is hingeably coupled to the air box.

The radiator may have a plurality of sidewalls on its front side that are configured to seal against the back of the air box in a first sealed position. The frame may be hingeably coupled to the bottom of the air box to pivot the radiator from the first sealed position to a second unsealed position in which the upper portion of the radiator is unsealed from the rear of the air box and provides a operator-accessible gap between a rear wall of the oil cooler and a front wall of the radiator. The operator-accessible gap may be opened wide enough to allow water to be sprayed through the gap and directly against the rear of the oil cooler and the front of the radiator. The air box may include one sidewall with a slot for receiving one of an inlet fitting and an outlet fitting, and a hole on an opposing sidewall for receiving another of an inlet and an outlet fitting. The air box may be fixed to a heat exchanger support that is, in turn, fixed to a chassis of the vehicle, the heat exchanger support having two vertical members disposed on either side of the air box and a laterally extending top member fixed to the tops of the two vertical members. The system may further include a louvered duct that is pivotally mounted to move from a first sealed position in which it is sealed against the back side of the radiator and a second open position in which it is pivoted away from the back side of the radiator. The duct may be fixed to a frame of a rear door of the vehicle. The rear door may include a panel that is mounted on the door to be pivotable from a first position in which is disposed on top of the radiator to a second position in which it is to one side of the radiator.

In accordance with a second aspect of the invention, a radiator mounting system for a skid steer vehicle is provided, including an air box configured as an air duct to conduct substantially all cooling air required for an oil cooler and a radiator, the air box having a front wall, at least four sidewalls, and an open back, wherein the front wall shrouds an engine cooling air fan, an oil cooler disposed in the air box and having at least four lateral edges sealed against the at least four sidewalls of the air box; a radiator in the form of a plane having at least four lateral edges, a back side, and a front side; and a radiator support coupled to and supporting the radiator, wherein the radiator support is hingeably coupled to the air box.

The radiator may have a first sealed position in which the edges of the radiator are configured to seal against the air box. The radiator may be configured to be pivoted about one pivotal axis from its first sealed position to a second unsealed position in which the radiator is unsealed from the rear of the air box and an operator-accessible gap is provided between a rear wall of the oil cooler and a front wall of the radiator. The operator-accessible gap may be wide enough to allow water and air to be manually introduced through the gap and sprayed against the rear of the oil cooler and the front of the radiator when the radiator is in the second unsealed position.

The air box may include at least one sidewall having a slot for receiving one of a cooler inlet fitting and an outlet fitting, and at least another sidewall having a hole for receiving another of a cooler inlet and an outlet fitting. The air box may be fixed at least to a heat exchanger support, the heat exchanger support having two vertical members disposed on either side of the air box and a laterally extending top member fixed to the tops of the two vertical members. The system may further include a louvered duct that is pivotally mounted to move from a first sealed position in which the duct is sealed against the back side of the radiator and a second open position in which the duct is pivoted away from the back side of the radiator. The duct may be fixed to a frame of a rear door of the vehicle. The rear door may include a panel that is mounted on the door to be pivotable from a first position in which is disposed on top of the radiator to a second position in which it is to one side of the radiator.

In accordance with a third aspect of the invention, a method of opening a radiator mounting system of a skid steer vehicle for cleaning is provided, including the steps of opening a skid steer rear door containing a cooling air duct; unlatching a radiator; and pivoting the unlatched radiator backward away from an oil cooler.

The step of opening a skid steer rear door may include the step of pivoting a louvered rear door containing an air duct away from sealing engagement with the radiator. The step of pivoting the unlatched radiator may include the step of pivoting the radiator about a pivotal axis disposed along a forward surface of a lower tank of the radiator. The step of pivoting the radiator about a pivotal axis disposed along a forward surface of a lower tank of the radiator may include the step of pivoting the radiator from a first position in which it is substantially parallel to an oil cooler and spaced behind the oil cooler with a gap therebetween of between 0.5 inches and 2.0 inches, to a second position in which the radiator is disposed at an angle of between zero degrees and thirty degrees with respect to the oil cooler.

In accordance with a fourth aspect of the invention, a radiator and mounting system for a work vehicle is provided that includes a radiator having a top tank, a bottom tank and a core, the radiator having a peripheral edge that extends across the top of the top tank, down each side of the radiator core and across the bottom of the bottom tank; and a frame configured to extend around the peripheral edge of the radiator, wherein the frame is configured to be pivotally coupled to a chassis of the work vehicle.

The frame may include a first subframe and a second subframe that are coupled together with threaded fasteners along the peripheral edge of the radiator. The radiator may have a plastic top tank and a plastic bottom tank. The radiator may have an aluminum core. The top tank and the bottom tank may have means for coupling the radiator and frame that are engaged with corresponding structures on the frame. The radiator and mounting system may further include a plurality of elastomeric supports that are disposed between each of the means for coupling and the frame. The means for coupling may be plastic. The first subframe may be a top frame configured to extend across the top surface of the top tank and the second frame may be a bottom frame configured to extend across the bottom surface of the bottom tank.

In accordance with a fifth aspect of the invention, a radiator and mounting system for a work vehicle is provided including a radiator with a top tank, a bottom tank and a core, the radiator having a peripheral edge that extends across the top of the top tank, down each side of the radiator core and across the bottom of the bottom tank; and a radiator mount configured to extend around at least a portion of the peripheral edge of the radiator, wherein the radiator mount is configured to be pivotally coupled to a chassis of the work vehicle.

The radiator may have a plastic top tank and a plastic bottom tank and the radiator mount may be coupled to the both the plastic top tank and the plastic bottom tank. The top tank and the bottom tank may have means for coupling the radiator and frame that are engaged with the radiator mount. The radiator and mounting system may further include a plurality of resilient supports that are disposed between each of the means for coupling and the frame. The means for coupling may be plastic. The core may be made of aluminum and the radiator mount may include a hinge.

BRIEF DESCRIPTION OF THE DRAWINGS

FIG. 9 also shows a rear fragment of right side chassis member 136 (to which the radiator support is bolted) as well as elongated and laterally extending interlocking member 196 that interlocks with the lower portion of door 110 (not shown in FIG. 9) to protect the door.

DETAILED DESCRIPTION OF THE PREFERRED EMBODIMENTS

Figure 1:
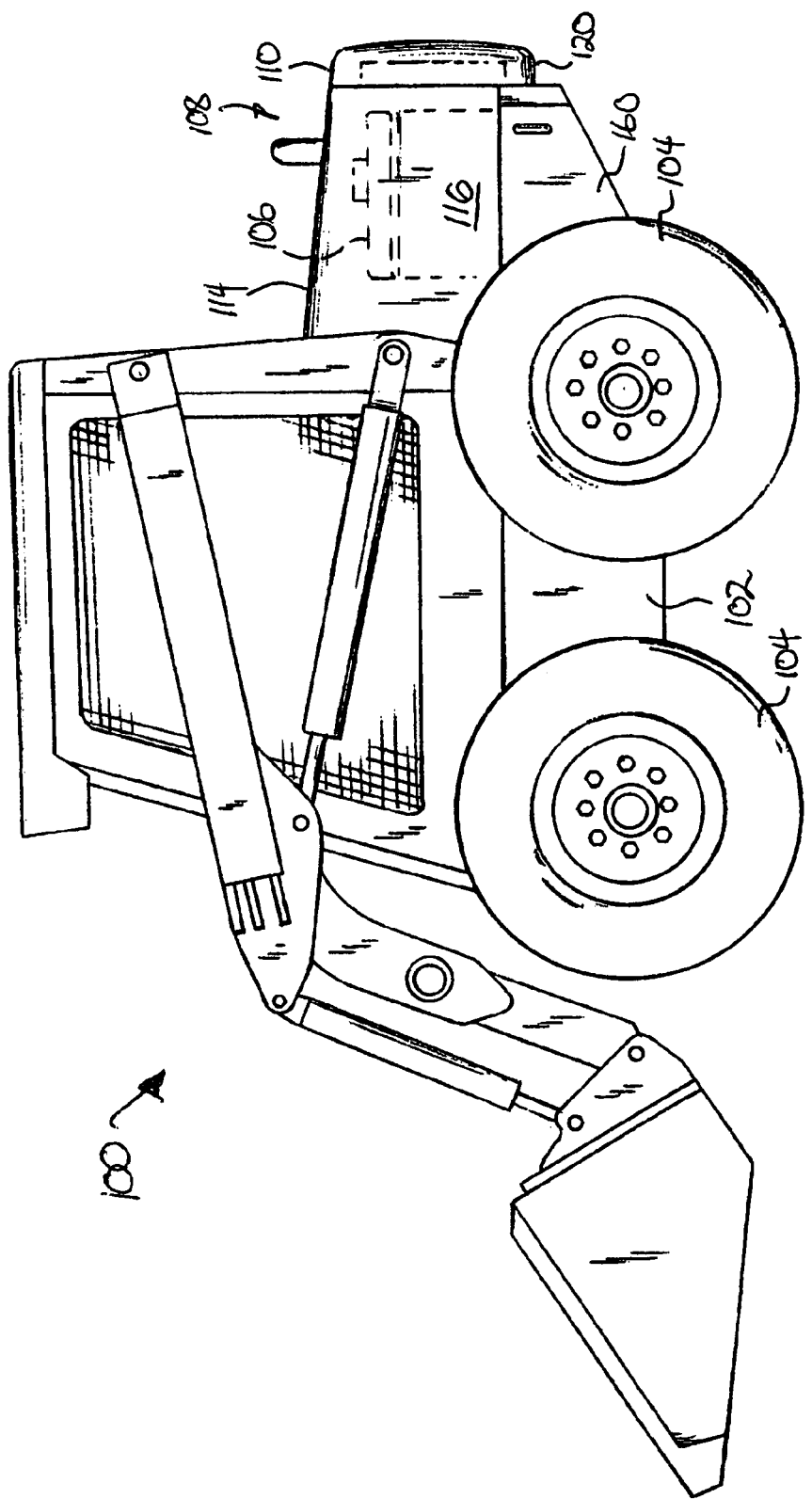
FIG. 1 is a left side view of a skid steer vehicle in accordance with the present invention.
Figure 2:
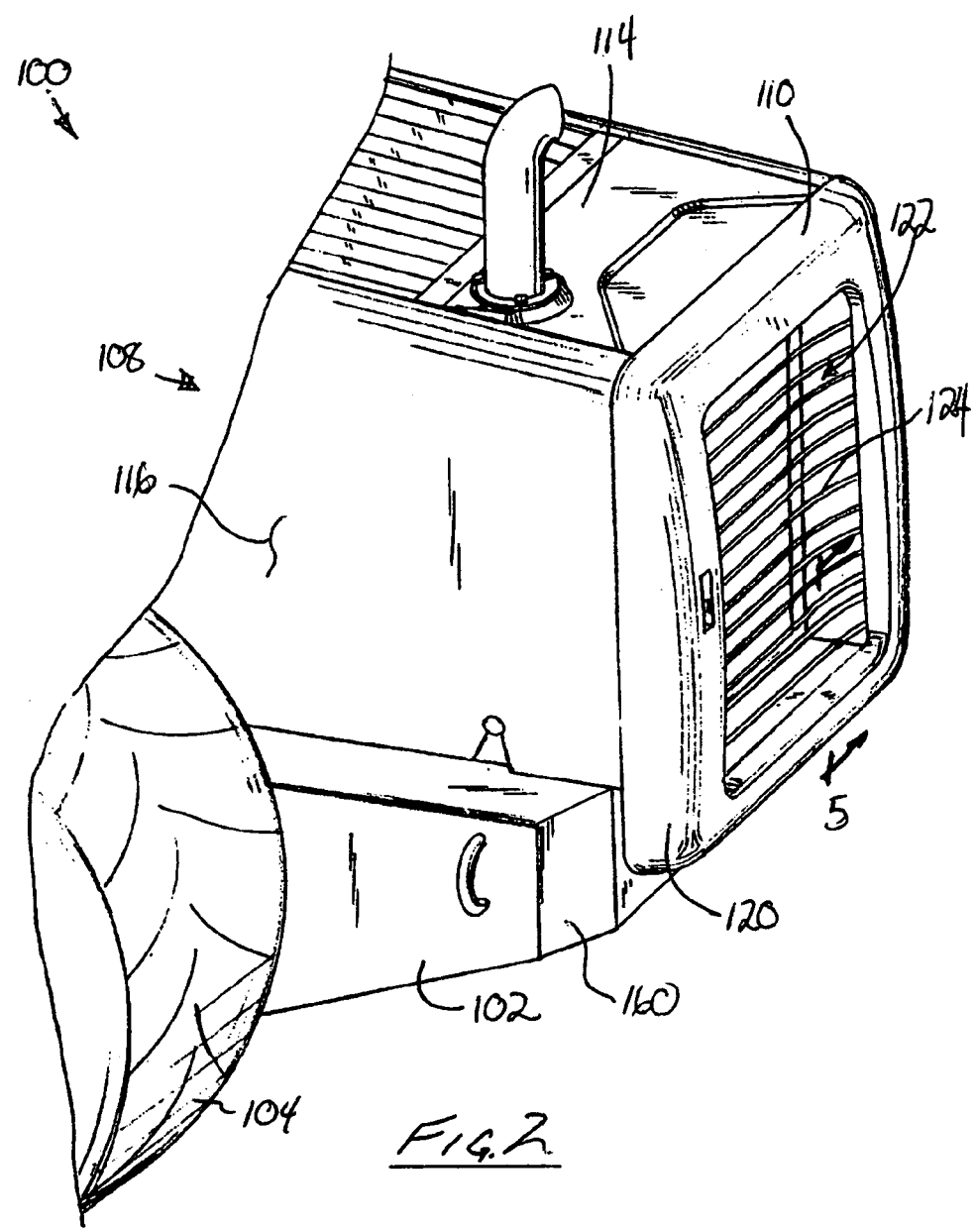
FIG. 2 is a fragmentary left side perspective rear view of the vehicle of FIG. 1 with the rear door closed.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Referring now to the FIGURES, there is illustrated a skid steer vehicle 100. The vehicle includes a chassis 102 on which are mounted four wheels (two shown) 104. These wheels are disposed two on each side in a fore-and-aft relationship. All the wheels are drive wheels, driven by engine 106 that is disposed in a rear engine compartment 108 of vehicle 100.

Engine compartment 108 encloses engine 106, surrounding it on all four sides as well as its top. A rear engine compartment door 110 encloses the rear of the engine compartment and protects a transversely-mounted rear radiator 112 and transversely mounted rear oil cooler 113 that are fixed to the chassis behind the engine.

The engine compartment 108 includes a top panel 114, a left side panel 116, and a right side panel 118. These panels enclose not only the engine 106, but the radiator 112 and the oil cooler 113 as well. The left panel is fixed to and supported by an elongated and longitudinally-extending left side chassis member 160 which can be seen best in FIG. 1. The right panel 118 is fixed to and supported by an elongated and longitudinally extending right side chassis member 136 that is configured identically to left side chassis member 160, but is disposed along the right side of the chassis and is formed as a mirror image of member 10. Chassis members 160 and 136 extend backward along both sides of engine 106, which is fixed to both members.

Door 110 seals against top panel 114 as well as side panels 116, and 118 to provide protection both from the elements and from rigid objects that might damage the engine and radiator if the operator backs vehicle 100 backs up into them.

Door 110 is in the form of a rectangular frame 120 having a central rectangular opening 122. Opening 122 is covered with louvers 124 that are disposed vertically across the aperture formed by the opening. These louvers can be pivoted about their longitudinal axes to abut one another and close opening 122, or alternatively to open and permit air to pass therethrough. In this manner, the operator can regulate the amount of cooling provided by the radiator, which is disposed right behind door 110.

Door 110 is supported by two hinges, an upper hinge 126 and a lower hinge 128. The upper hinge includes two hinge plates 130,132 (FIG. 4), and a pin (not shown) pivotally coupling the two plates together. Hinge plate 130 is bolted to a vertical member 134 that in turn is bolted to right side chassis member 136. Plate 132 is fixed to door frame 120 and pivots together with the frame of the door when the door is opened.

Figure 3:
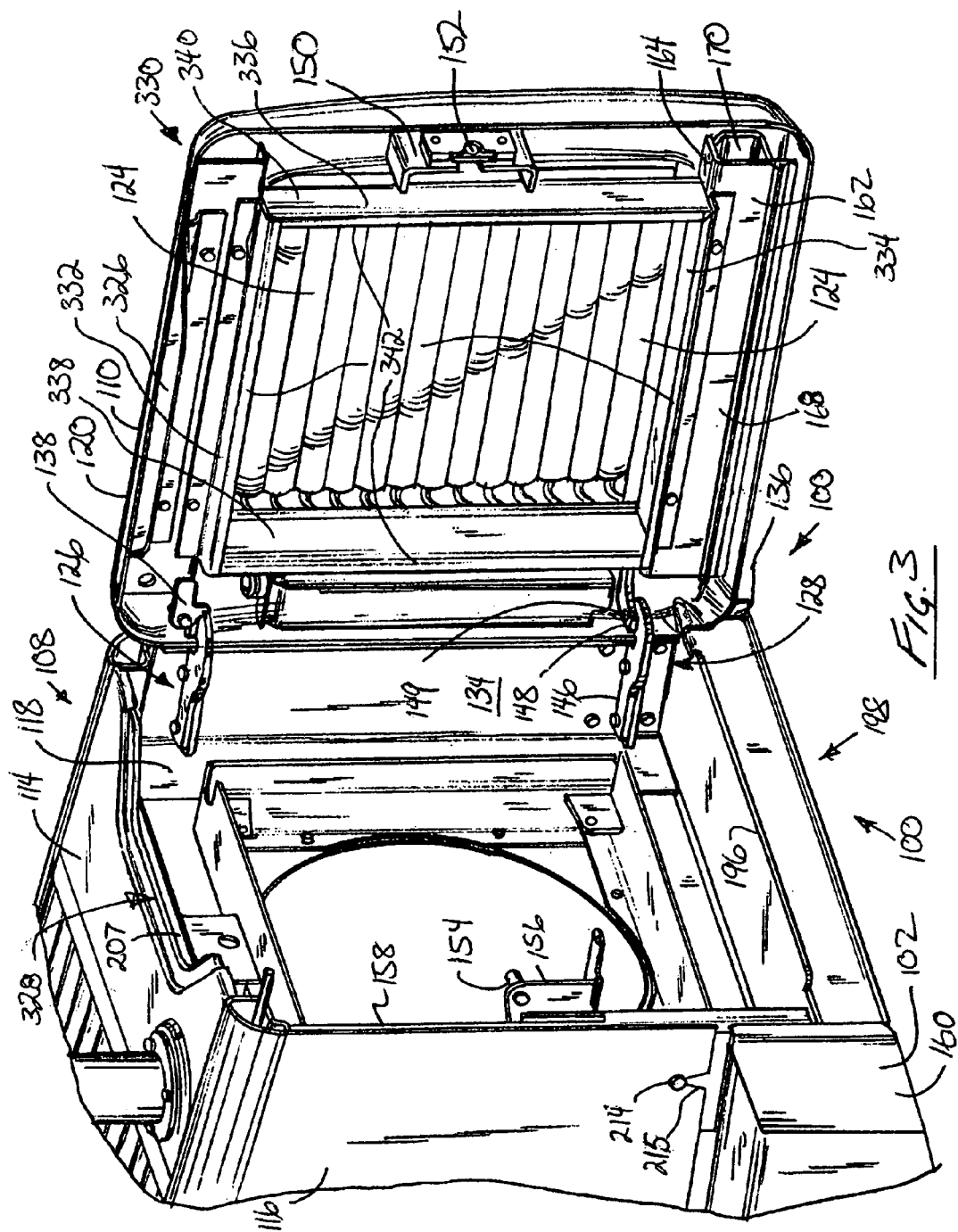
FIG. 3 is a fragmentary left side perspective rear view of the vehicle of FIGS. 1 and 2 with the rear door open showing the chassis interlock and the inner door construction including the hinges, louvers and latches.
Figure 4:
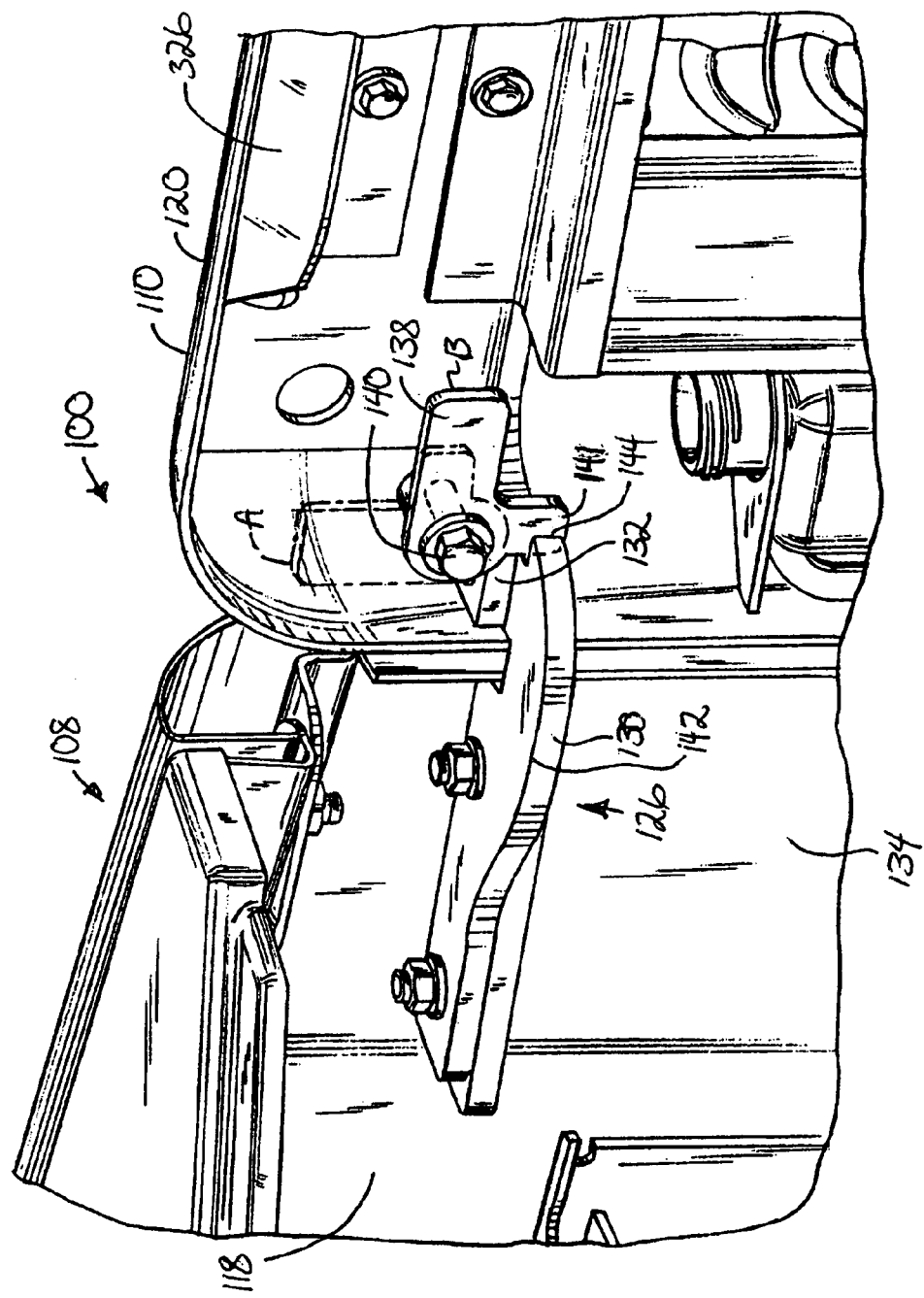
FIG. 4 is a fragmentary detailed perspective view of the upper hinge area of the vehicle shown in FIG. 3.

Referring now to FIGS. 3 and 4, a latch 138 is pivotally coupled to door frame 120. It holds the door open in a first position, and permits the door to be closed in a second position. Latch 138 is pivotally mounted to door 110 by a bolt 140. As the door is opened, hinge plate 132, which is fixed to the door frame, pivots about hinge plate 130, which is fixed with respect to the chassis. Latch 138 pivots together with plate 132 and the door as the door is opened, with its tang 141 sliding along the top outer edge 142 of plate 130.

Figure 6:
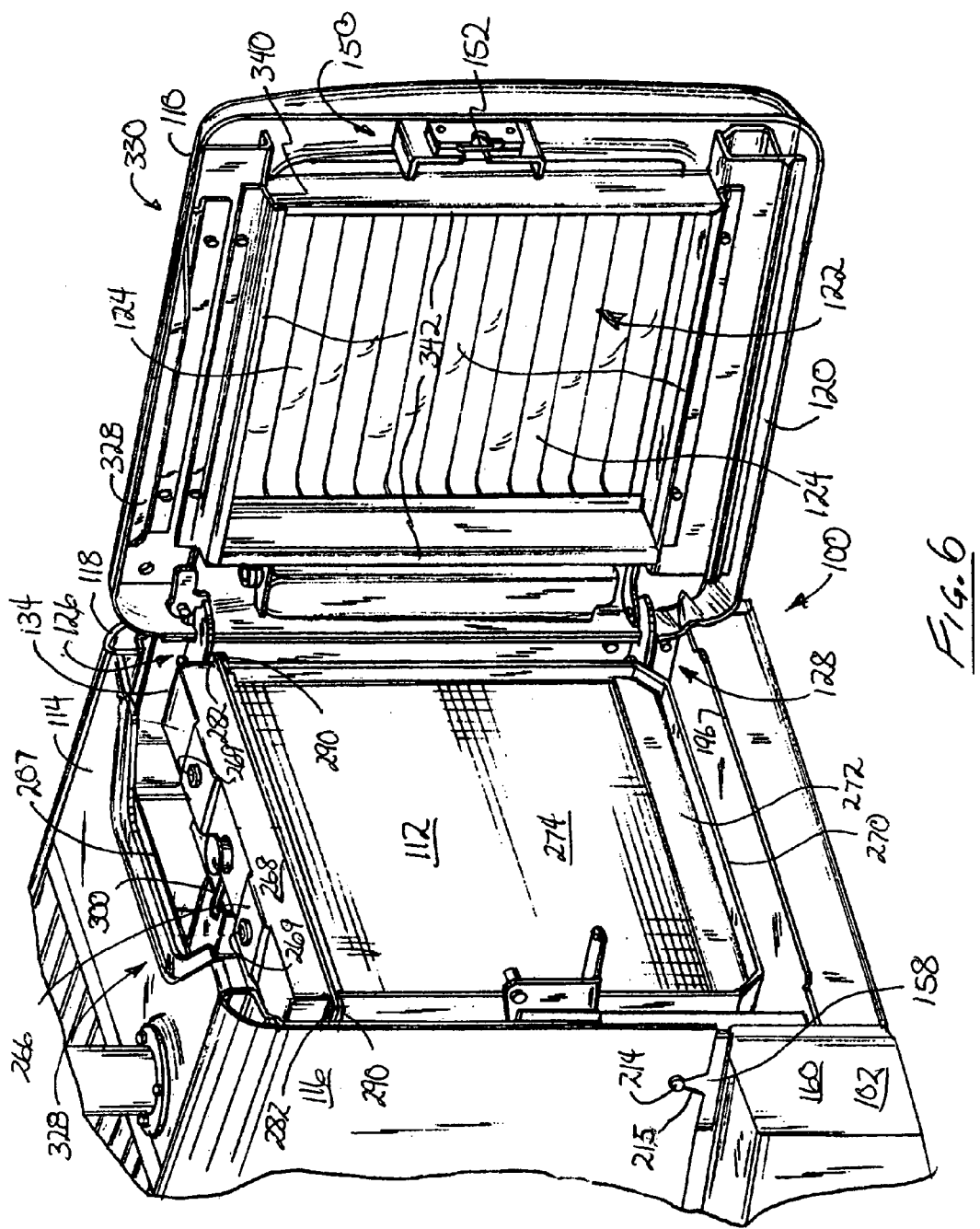
FIG. 6 is a fragmentary left side rear perspective view identical to that of FIG. 3, but with the addition of the two heat exchangers: the engine radiator and hydraulic fluid or oil cooler.

Latch 138 offers no resistance to this door opening, until the door is almost completely open (as shown in FIGS. 3, 4, and 6), at which point a slot 144 in plate 130 moves underneath latch 138. Slot 144 is just wide enough to receive the outwardly extending tang 141. The weight of tang 141 unbalances latch 138, causing it to fall of its own weight into slot 144.

Latch 138 is shown in two positions in FIG. 4: a first unlatched position "A" shown in phantom lines, and a second latched position "B" shown in solid lines. Position "B" illustrates how the latch would appear when it has rotated about 90 degrees clockwise under the force of gravity. The latch is configured such that it is not perfectly balanced when in position "A", but is top heavy. The top heavy position is determined by the location of the hole in latch 138 through which bolt 140 passes. This hole is located such that latch 138 is not only top heavy, but tends to rotate in a clockwise direction (in FIG. 3), supported by top edge 142 of plate 130.

Lower hinge 128 similarly includes two plates 146, 148 and a pin 149 pivotally coupling the two plates together. These plates and pin are identically arranged to those of the upper hinge. Hinge plate 146 is bolted to vertical member 134. Plate 148 is fixed to door frame 120 and pivots together with the door frame when the door is opened.

The door hinges are preferably arranged so that the entire door may be removed from the vehicle by lifting the door upward until the hinge pins of the upper and lower hinges are removed from their corresponding hinge plates. The operator can stop the vehicle, open the door, lift the door upward from the bottom, and remove the door from vehicle 100.

A spring loaded door latch 150 is fixed to the opposite side of the door as hinges 126,128. It has a catch 152 that grasps a rod 154 extending from striker plate 156. Striker plate 156 is bolted to vertical member 158 that, in turn, is bolted to chassis member 160. The engagement of catch 152 and rod 154 prevents the door both from being opened and from being lifted off its hinges. When an upward force is applied to the closed door, the catch and rod interengage to prevent the door from moving upward.

While the catch and rod are sufficiently strong to resist the force of one or two people trying to lift the closed door upward off its hinges, they may not be sufficient to prevent a substantial upward blow to the bottom of the door from lifting the door upward and either damaging the catch and rod, or damaging both the catch and rod, and the hinges, too.

To resist these more forceful blows or impacts from lifting the door and damaging the various door components, additional support structures are provided. These support structures include mechanically interengaging (or interlocking) members that resist the relative upward movement of the door with respect to the rest of the vehicle. These members are located at the bottom of the engine compartment opening and extend across the entire width of the opening.

These additional support structures are provided on both door and the chassis. They are configured to interlock automatically whenever the door is closed and disengage automatically whenever the door is opened. No additional operator activity is required to interlock these structures.

Figure 5:
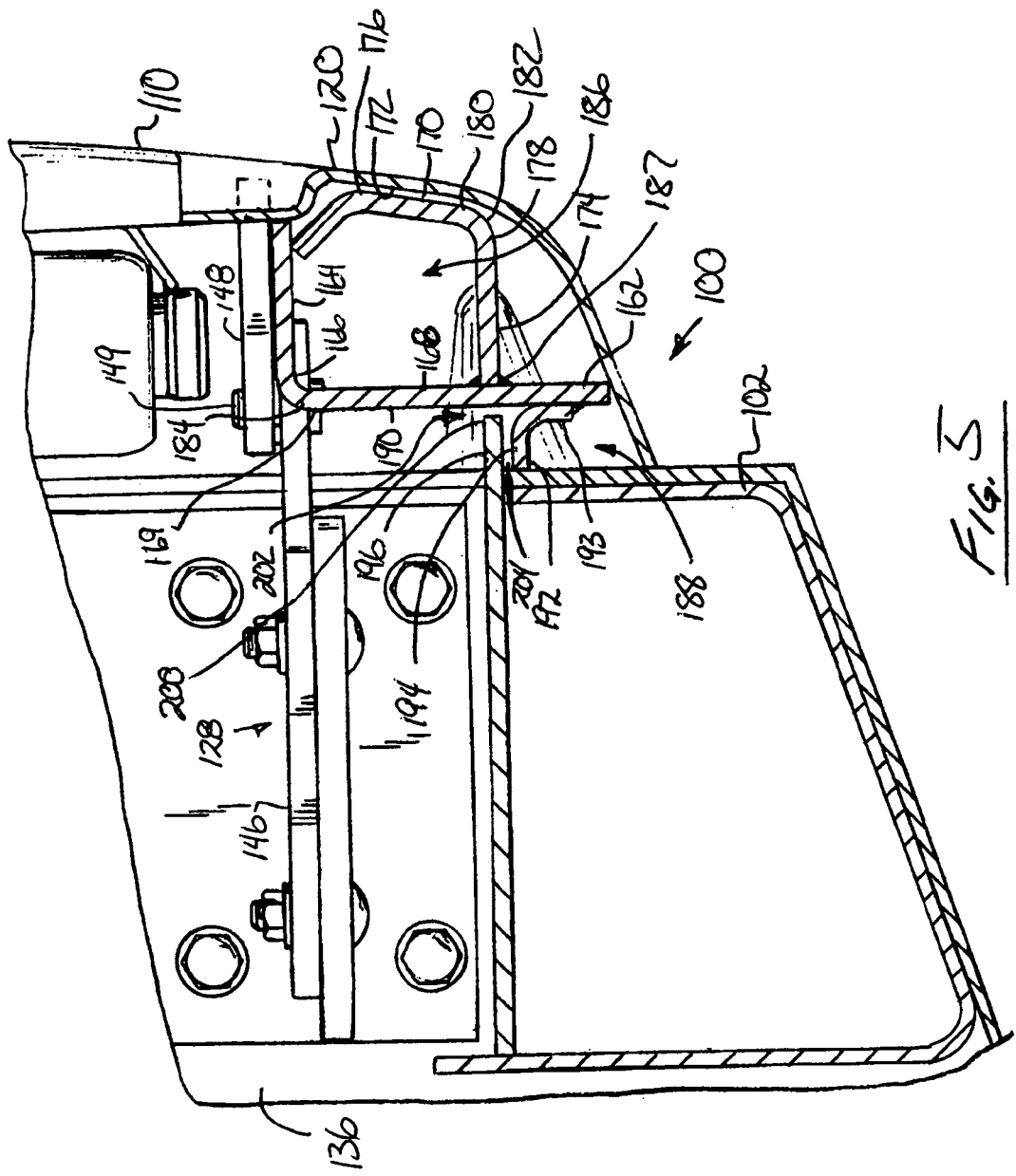
FIG. 5 is a fragmentary cross-sectional view of the rear door and chassis of the vehicle of the foregoing FIGURES when the door is in the closed position as shown in FIGS. 1 and 2 taken along section line 5 in FIG. 2.

FIGS. 3 and 5 show these structures in particular detail. In FIG. 3, they are shown as they would appear when the door is open and the structures are not mutually interengaged. In the positions shown in FIG. 3, the door can be lifted off the vehicle without damaging the door or the vehicle itself.

FIG. 5 shows the additional support structures as they are positioned when the door is closed. In FIG. 5 they are shown interlocked to resist the upward movement of the door.

Referring now to FIGS. 3 and 5, the structures include a first beam member 162 that is fixed to an inner surface of door frame 120 just below door opening 122. Member 162 may be permanently or removably fixed to door frame 120, such as by welding or bolting the member thereto.

Member 162 extends laterally, side-to-side, across the entire width of the engine compartment opening. It has the form of an L-shaped beam comprised to two major planar portions: a first planar portion 164 extending horizontally that is fixed along its laterally extending leading edge 166 to a vertically and laterally extending planar beam portion 168 having a top edge portion 169 that is fixed to edge 166.

Member 162 is fixed to a second beam member 170 that also extends laterally, side-to-side and is in turn fixed to the inner surface 172 of the lower portion of door frame 120 just below opening 122. Beam member 170 includes a first planar portion 174 that extends generally horizontally and laterally within door frame 120. It also includes a second planar beam portion 176 that extends generally laterally and vertically within door frame 120. Planar beam portions 174 and 176 are fixed together along a rearward and laterally extending edge 178 of beam portion 174 and along a bottom and laterally extending edge 180 of beam portion 176.

Beam portion 176 generally follows the contours of the inside rear surface 172 of door frame 120 just below door opening 122. Beam portion 176 preferably abuts and is fixed to the inside surface of door frame 120 over substantially its entire width to provide a relatively large area of support for the lower portion of the door. Since the lower portion of the door typically impacts such things as piles of dirt, sand, or rock first, it is the most prone to damage. Locating the beam members along (and fixing the beam members to) this lower portion of the door, provides particularly good protection against door damage.

While we describe edges 178 and 180 above as being fixed together, they need not be formed separately and then fixed together, but may be formed integrally from a single sheet of metal that is bent to form a laterally extending bend 182 that defines the junction between beam portions 174 and 176.

Similarly, beam member 162 may be formed from a single sheet of metal that is bent, thereby forming a laterally extending bend 184 at the junction of beam portion 164 and beam portion 168.

Beam member 162 and beam member 170 together form a generally rectangular box beam, having an internal, laterally extending, and generally rectangular hollow 186. This arrangement enhances the individual strength of beam members 162 and 170.

Beam member 162 and beam member 170 are fixed together to provide additional strength for the lower portion of door frame 120 and additional resistance to deformation when the door is impacted. As shown in FIG. 5, the two are fixed together by a weldment 187 that extends laterally, from side-to-side, inside door frame 120. While a weldment is preferred, the two components may be removably fixed together with bolts, for example. This arrangement can be employed to permit each beam to be more easily mounted to the door or to permit each beam to be adjusted with respect to the other.

A third component of the additional support structures is an elongated and laterally extending edge member 188 that is fixed to a forward facing vertical surface 190 of beam member 162. Edge member 188 includes a horizontally and laterally extending portion 192, shown here as a planar and linearly extending flange, that is coupled to a vertically and laterally extending portion 193, also shown as a planar and laterally extending flange.

Member 188 has a generally "L"-shaped form, commonly known as "angle iron" or "angle bracket" that is comprised of flanges 192 and 193, the two flanges being joined at right angles to one another along an upper edge of flange 193. Vertically extending flange 193 is fixed to vertical and forward facing surface 190 of member 162, preferably by welding.

Portion 192 has an upper surface 194 that is surmounted by an elongated interlocking member 196. Interlocking member 196 is shown in the FIGURES as a horizontally disposed planar sheet of steel that extends outward from the rear opening 198 (FIG. 5) of the engine compartment. Member 196 extends laterally across the engine compartment from one side to the other. Member 196 is fixed to and between the two elongate chassis members When door frame 120 is closed, member 196 is disposed immediately adjacent to and slightly above upper surface 194 of horizontally and laterally extending portion 192 of edge member 188. In this position, member 196 cooperates with surface 194 to prevent the door from moving upward when an upward force is applied to the door and the door is closed.

Member 196 and portion 192 extend substantially the entire distance across the engine compartment opening 198. This arrangement distributes the upward force of any door impact over substantially the entire width of the door, and over substantially the entire length of members 162 and 170.

Just as the additional support structures reduce damage to the door from being forced upward, they also reduce damage to the door by being forced forward and inward toward the engine compartment opening 198. When the door receives an impact that drives the door forward and generally into the engine compartment, vertically and laterally extending beam portion 168 of beam member 162 is forced forward against the rear edge 200 of member 196. This transfers the load on the door to the member 196 which is fixed to the vehicle chassis. When this impact occurs, edge 200 engages surface 190 of beam member 162 over substantially the entire width of the engine compartment opening.

The door is positioned by adjusting the positions of the hinges and the latch. For this reason, a narrow gap 202 is provided between rear-facing edge 200 and the forward-facing surface 190 of beam member 162. A similar narrow gap 204 is provided between upper surface 194 and the bottom surface of member 196. These two gaps extend laterally across the width of the engine compartment opening. The width of each gap 202,204 is preferably the same across the entire width of the engine compartment.

The foregoing structures provide support and protection for the rear door of the skid steer vehicle. They also provide a degree of protection for the vehicle's heat exchangers, including radiator 112 which is disposed slightly forward of rear door 110 in the engine compartment (FIG. 6), and hydraulic fluid or oil cooler 113 which is located just forward of radiator 112. This can be best seen in FIG. 6. (FIG. 6 is identical to FIG. 3, but adds radiator 112 and the oil cooler 113).

In FIG. 6 the two heat exchangers—radiator 112 and oil cooler 113—are disposed between vertical member 134 on the right side of the vehicle and vertical member 158 on the other side of the vehicle. Vertical members 134 and 158, together with elongated and laterally extending horizontal top member 207 comprise the heat exchanger support 206 (FIG. 7).

Heat exchanger support 206 is fixed to and extends upward and across the two chassis members 160 and 136. The vertical members 158,134 are fixed to chassis members 160,136, respectively, and extend upward. Horizontal member 207 is fixed to the tops of vertical members 158, 134, typically by welding and joins them together. The effect is to create an arch that extends upward from one chassis member, across the top of the engine compartment, and downward to the other chassis member.

Figure 7:
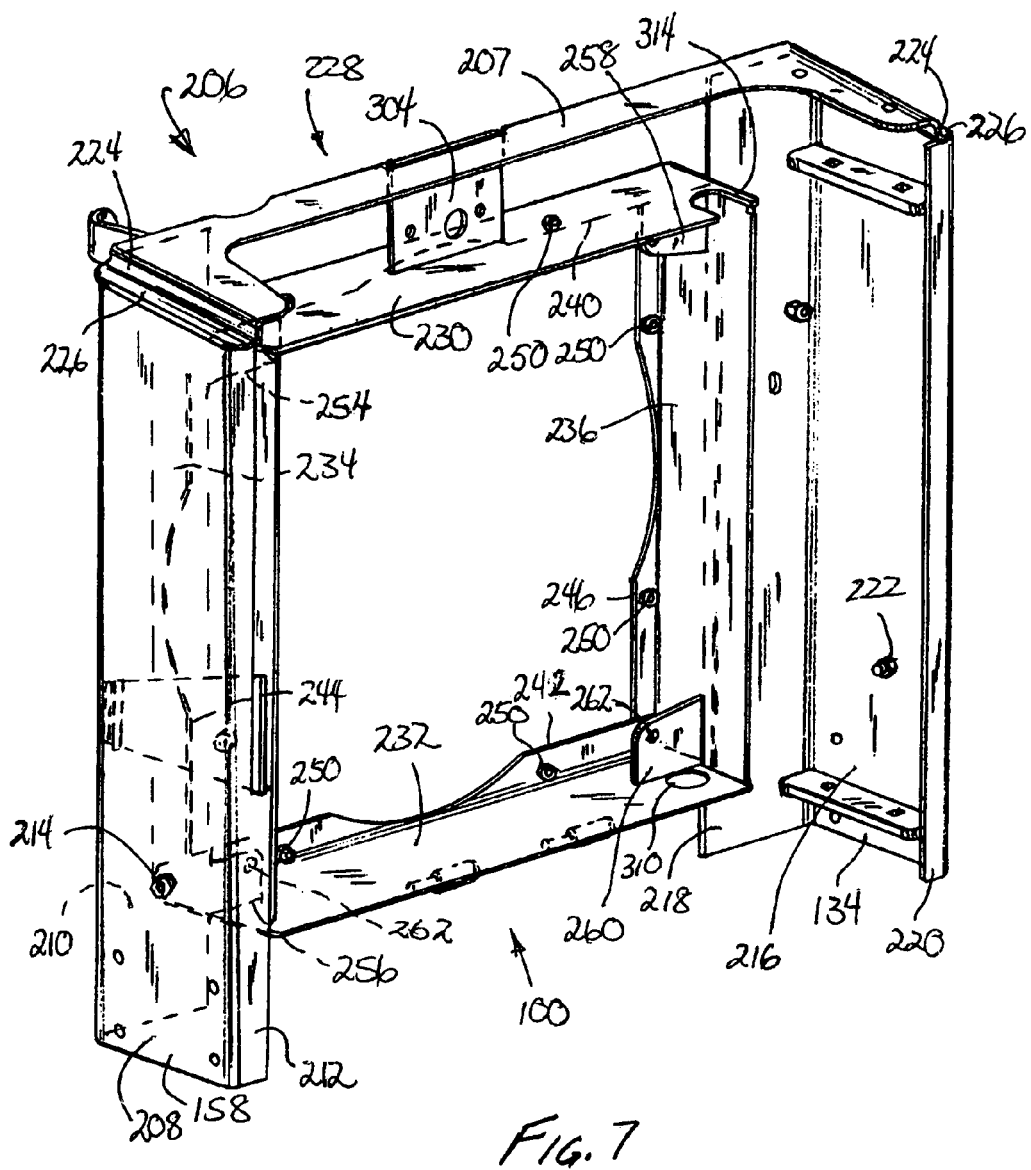
FIG. 7 is a left side perspective view of the radiator support from the same perspective as it is shown in FIGS. 3 and 6, but with the other vehicle components removed for clarity.

As best shown in FIG. 7, left side vertical member 158 is in the form of a U-shaped (in cross section) channel. It has a web portion 208 that extends both vertically as well as fore-and-aft. This web portion is bolted to an inwardly facing surface of chassis member 160. Vertical member 158 also includes a front flange 210 that is fixed to the leading edge of web portion 208 and extends laterally inward toward the centerline of the vehicle from web portion 208, as well as a rear flange 212 that is fixed to the trailing edge of web portion 208 and extends laterally inward toward the centerline of the vehicle from web portion 208. Both front flange 210 and rear flange 212 add stiffness and rigidity to vertical member 158.

A headed pin 214 is fixed to the outside lower portion of left side vertical member 158. Pin 214 engages slot 215 (FIGS. 3, 6) on left side panel 116 of the engine compartment, which holds the panel against vertical member 158.

Right side vertical member 134 is configured similarly to left side member 158. Vertical member 134 is also in the form of a U-shaped (in cross section) channel. It has a web portion 216 that extends both vertically as well as fore-and-aft. This web portion is bolted to an inwardly facing surface of chassis member 136. Heat exchanger support 206 also includes a front flange 218 that is fixed to the leading edge of web portion 216 and extends laterally inward toward the centerline of the vehicle from web portion 216, as well as a rear flange 220 that is fixed to the trailing edge of web portion 216 and extends laterally inward toward the centerline of the vehicle from web portion 216. Both front flange 218 and rear flange 220 add stiffness and rigidity to vertical member 134.

A headed pin 222 is fixed to the outside lower portion of right side vertical member 134. Pin 222 engages a slot (not shown) on the right side panel of the engine compartment, which holds the panel against the outside surface of vertical member 134. The right side panel is constructed identically to the left side panel, but in mirror image.

Horizontal member 207 is in the form of a flat planar sheet that extends horizontally and laterally to join the two upright vertical members. The left and right ends of the sheet are bent to provide additional stiffness and a better welded connection to the vertical members 158,134, respectively. The left and right ends of member 207 are bent identically to form a downwardly extending portion 224 about one inch in height, and then is bent again, to form an outwardly extending portion 226 about one inch in length.

The upper ends of vertical members 134, 158 are welded to the left and right ends of horizontal member 207 to form the outer portion of heat exchanger support 206.

Heat exchanger support 206 also includes a combined oil cooler frame and air box 228 that is fixed to vertical members 134, 158. Air box 228 includes top, bottom, left and right frame members 230, 232, 234,236, which extend the length of the top, bottom, left and right sides of oil cooler 113. These frame members are fixed to each other at their ends to provide a single piece frame that extends completely around the periphery of the oil cooler.

The width of frame members 230, 232, 234,236 in the longitudinal direction (i.e. the direction perpendicular to the plane of the oil cooler) is the same for all four frame members. It is about three-and-a-half inches wider than the oil cooler is thick.

Figure 10:
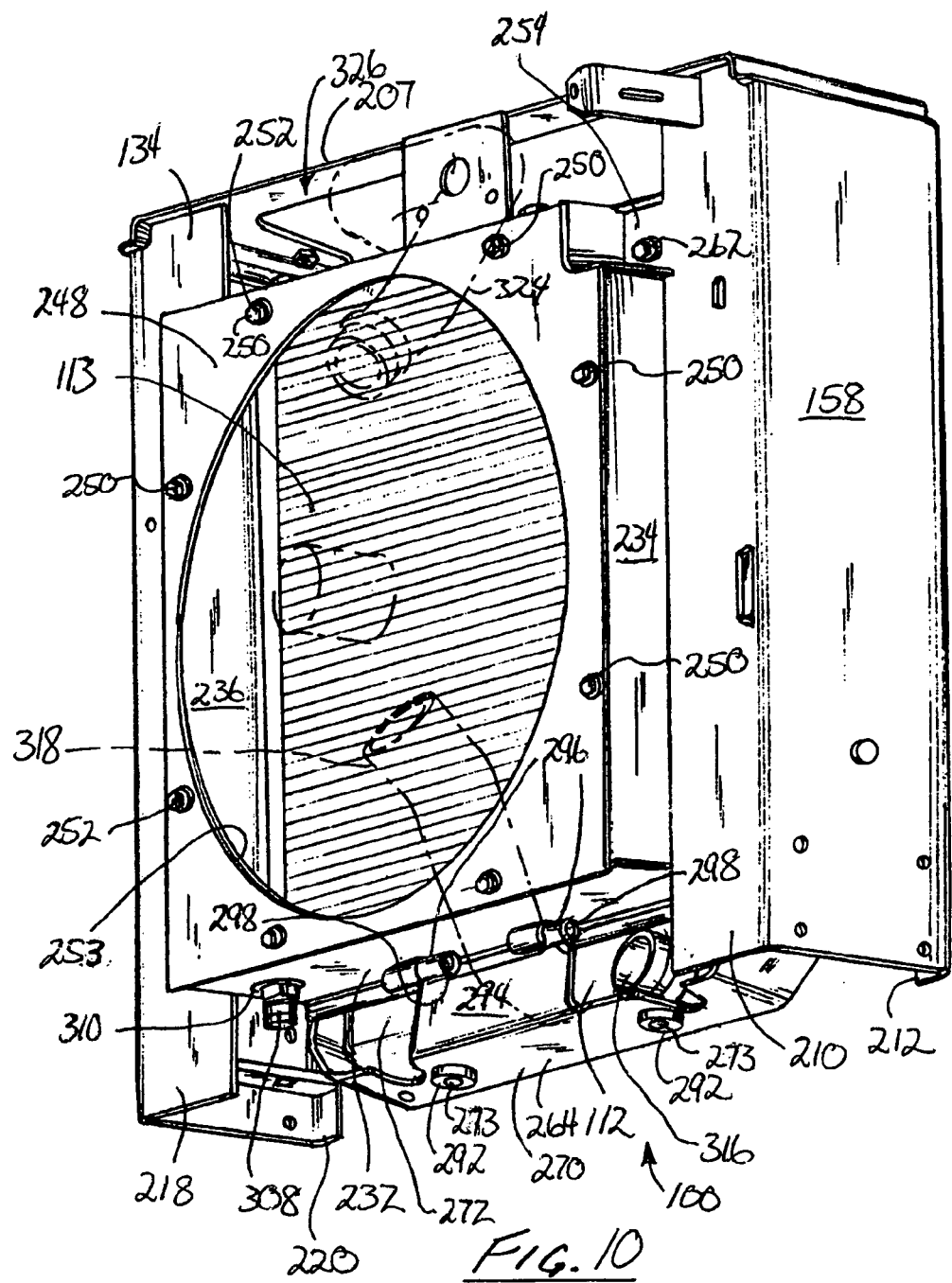
FIG. 10 is a front lower left side perspective view of the radiator support assembly, radiator and cooler of FIGS. 8 and 9, but from the front left side of the radiator support assembly. The other vehicle components have been removed for clarity.

The oil cooler 113 is fixed in air box 228 such that its rear surface 238 is recessed a distance of about one-half-inch forward of the rear edges of frame 228. This leaves three inches of air box 228 extending out ahead of the front surface of the oil cooler. Each frame member 230, 232, 234,236 has a corresponding flange 240, 242, 244, 246 (FIG. 7) that are formed by bending over the frontmost one-half to one inch width of the frame member at right angles to the frame member itself. The four flanges 240, 242, 244, 246 (FIG. 7) thereby created are all coplanar. Their coplanar outer surfaces together define a joint mounting surface for fan shroud plate 248 (FIG. 10).

Each flange 240, 242, 244, 246 has two threaded holes 250 that are disposed several inches apart on each flange. These holes serve as the mounting points for fan shroud plate 248. The fan shroud plate 248 has eight corresponding holes that can be aligned with eight holes 250. Once aligned, threaded fasteners 252 (FIG. 10) are inserted through the holes in the fan shroud plate, then into flanges 240, 242, 244, 246 and then tightened.

Figure 9:
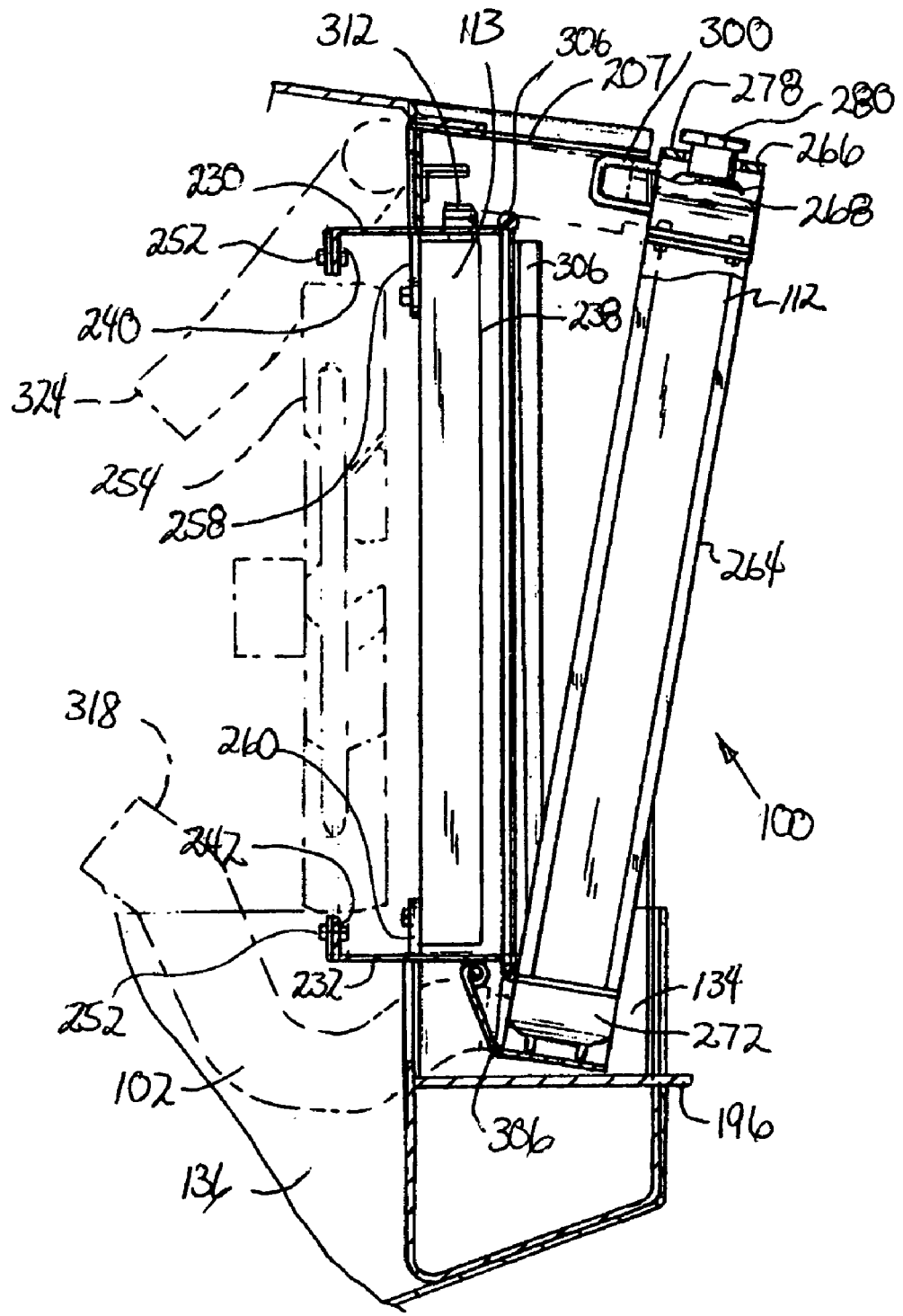
FIG. 9 is a fragmentary left side cross-sectional view of the radiator support assembly and radiators of FIG. 8 taken along section line 9-9 in FIG. 8.

Fan shroud plate 248 has a large central hole 253 that is sized to receive the blades of engine fan 254 (FIG. 9). The hole is between 0.25 and 1.0 inches larger in diameter than the circle inscribed by the longest blade of fan 254. This provides a small clearance between the fan blade tips and the fan shroud plate itself, preventing both the fan blades and the shroud plate from being damaged.

The eight holes in the fan shroud plate 248 for receiving fasteners 252 are preferably slightly larger than the shank of the fasteners to permit the fan shroud plate to be adjusted slightly up and down as well as to the left and right with respect to the fan blades.

Left and right frame members 234,236 are welded to left and right vertical members 158,134 approximately at the fore-and-aft midpoint of members 234,236. Left member 234 is welded to the free edge of the front flange 210 of left side vertical member 158, and right member 236 is welded to the free edge of front flange 218 of right side vertical member 134. This spacing is best shown in FIG. 9. Roughly half of air box 228 is forward of front flanges 210 and 218 and roughly half is positioned to the rear of front flanges 210 and 218.

Four tabs 254, 256, 258, 260 extend inwardly into the air box 228 from the fore-and-aft midline of air box frame members 230,232,234,236, just at the place where vertical members 158,134 abut (and are welded to) frame members 234, 236. These four tabs, best shown in FIGS. 7 and 9 are the four corner mounting points for oil cooler 113.

In the preferred embodiment, the four tabs 254, 256, 258, 260 are extensions of front flanges 210,218 of vertical members 158,134 that are inserted through correspondingly positioned slots in members 234,236 during assembly.

Each tab has a through-hole 262 that receives a threaded fastener, such as a bolt. Each bolt passes through its corresponding through-hole 262 and is threaded into a corresponding threaded fastener on the oil cooler 113. When the fasteners are tightened, the oil cooler is drawn against the tabs where it is fixed in place. Since the tabs are located along the vertical midline of frame members 234,236, this configuration holds the oil cooler in position in the air box 228 just behind the midline of members 234,236, leaving the front half of air box 228 empty.

Figure 8:
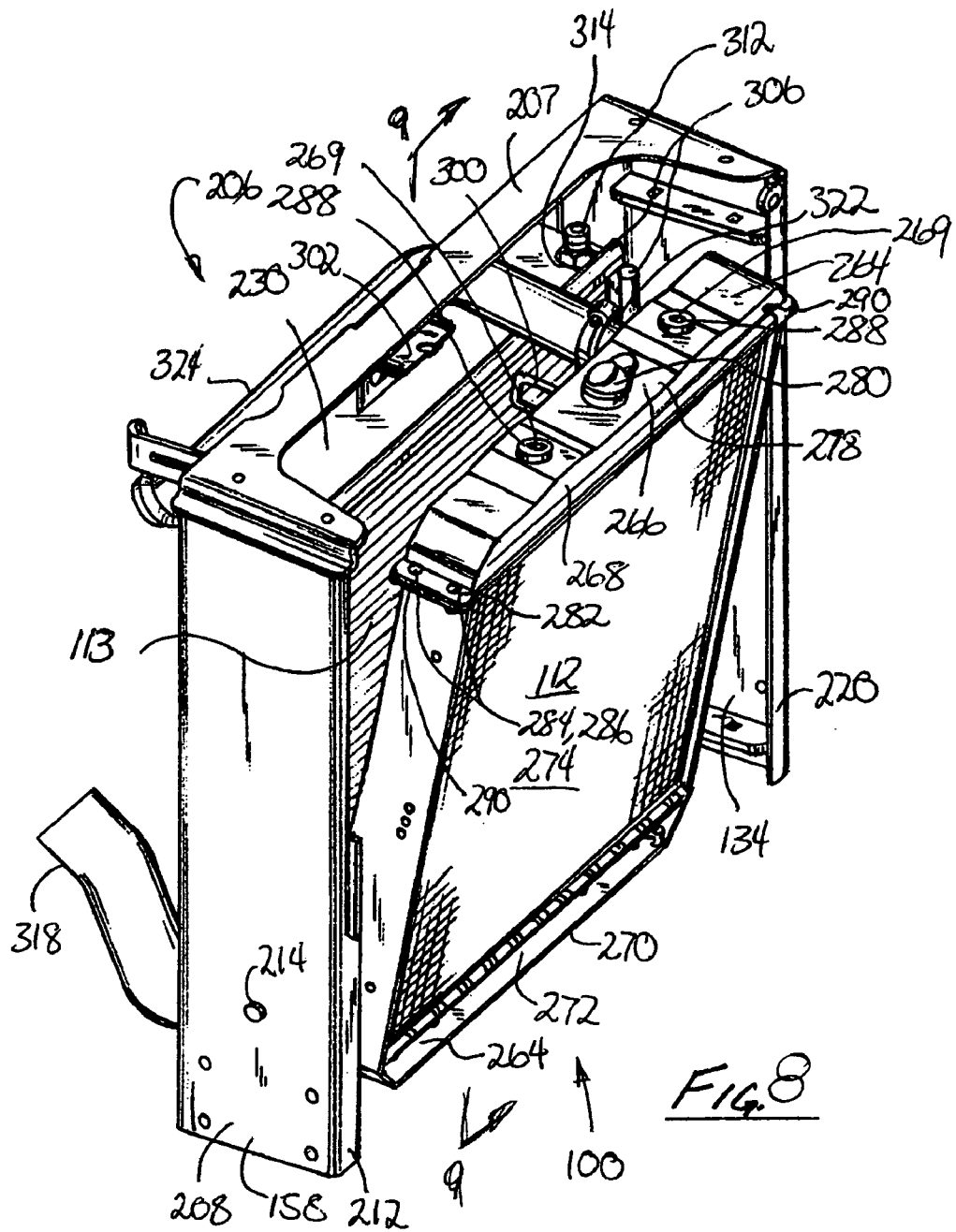
FIG. 8 is a left side perspective view of the radiator support assembly which includes the radiator support and the radiator frame assembly, together with the radiator and the oil cooler, with the other vehicle components removed. The radiator is shown pivoted to the rear and away from the oil cooler as it would appear when being cleaned out.

Referring now to FIGS. 8-10, radiator 112 is similarly mounted in a frame 264. The radiator frame 264, however, is not a part of or rigidly mounted to the heat exchanger support. Instead, it is pivotally mounted along its bottom edge to air box 228, permitting it to be tilted toward the air box and secured in position during machine operation, and tilted away from the air box for cleaning when the machine is shut down.

Mounting a radiator in a frame and hingeably mounting the frame to the vehicle chassis is new to work vehicles. This arrangement permits the use of automotive radiators such as radiator 112 that are designed to be fixedly mounted against a bulkhead or firewall.

Automotive radiators designed for fixed mounting have a lighter weight construction as compared to industrial radiators intended for use with construction vehicles. In particular, top tank 268 and bottom tank 272 of automotive-style radiator 112 are injection molded of a high density plastic. Furthermore, both the cooling fins and the internal tubular passageways of radiator core 274 are made of aluminum.

Another feature of automotive radiator 112 is the mounting arrangement for mounting the radiator to the frame and vehicle. Rather than having metallic threaded connectors that are fixed to the periphery of an industrial radiator, radiator 112 has pins or protrusions 269 that are molded integral with and extend upward from top tank 268, as well as pins or protrusions 273 that are molded integral with and extend downward from the bottom of bottom tank 272. In an alternative configuration (not shown) the top and bottom tanks may have indentations or recesses that receive corresponding pins or protrusions that extends from the frame. In a preferred arrangement, the tanks and the frame do not touch each other directly, but have elastomeric structures such as bushings or grommets that are interposed between the frame and radiator to support the radiator, reduce chafing and provide some resiliency in the coupling. This permits the radiator to float slightly with respect to the frame and to absorb impacts when the radiator is slammed closed.

Radiators with this plastic and aluminum construction that are supported by plastic pins extending from the top and bottom tanks to our knowledge have not been used in work vehicles (e.g. skid steer vehicle 100), and particularly not used in work vehicles with pivoting radiators that are subject to jarring impacts when the radiators are slammed closed.

The radiator frame 264 is formed of two main pieces: an upper frame 266 that wraps around the top (or upper) tank 268 of the radiator, and a lower frame 270 that wraps around both the lower (or bottom) tank 272 of the radiator and also up each side of the radiator core 274. The two frames are made of sheet metal having a fore-and-aft width equal to the fore-and-aft overall width of radiator 112 itself.

The upper frame 266 is comprised on an elongate strap of metal 278 having a hole through which the radiator fill tube 280 extends. This permits the radiator to be filled when the frame is installed around the periphery of the radiator. Strap 278 extends around the top tank of the radiator and slightly down both the left and the right side. Both the left and right ends of the strap terminate in mirror image mounting brackets 282, each bracket having two through-holes 284 sized to receive two threaded fasteners 286 that pass therethrough. The fasteners 286 extend through holes 284 and are threadedly engaged to a mating bracket 290 on lower frame 270. In the illustrations herein only the left side bracket 282 is shown. The bracket on the right side is identically configured, but in mirror image. Two resilient elastomeric grommets or bushings 288 are fixed between the upper frame 266 and the radiator to cushion the radiator within radiator frame 264. In a preferred embodiment, pins or protrusions 269 may be provided on the radiator top tank 268 and extend from the top tank into these grommets or bushings. This arrangement will reduce the chance that the radiator will shift with respect to radiator frame 266.

Lower frame 270 of the radiator foam is, like the upper frame, formed out of a strip of metal. This strip is bent to extend from the left side mounting bracket 282 of the upper frame, down the left side of the radiator 112, across the bottom of the radiator, and up the right side where it terminates at the mounting bracket on the right side (not shown). Both the left and right ends of lower frame 270 have mirror image mounting brackets 290 that are configured to be coupled to mounting brackets 282 of upper frame 266 by fasteners 286. Two resilient elastomeric grommets or bushings 292 (FIG. 10) are disposed between the lower frame and the bottom tank 272 of the radiator to cushion the radiator within the radiator frame. In a preferred embodiment, pins or protrusions 273 may be provided on the bottom tank and extend from the bottom tank of radiator 112 into these grommets or bushings 292. This arrangement will reduce the chance that the radiator will shift with respect to radiator frame 270.

The radiator frame is pivotally coupled to the air box 228 by hinge 294. Hinge 294 is fixed to lower frame 270 at its lower end and is pivotally coupled to bottom frame member 232 of air box 228 at its upper end. Hinge 294 extends upward from lower frame 270 along the front wall of lower tank 272 until it reaches the bottom of frame member 232 to which it is pivotally coupled. Hinge 294 has two gudgeons 296 along its upper edge that engage two spaced apart pins 298 that are fixed to the bottom rear edge of frame member 232.

The hinge 294 defines a pivotal axis about which the radiator pivots from its closed position, shown in FIG. 6, to its open position shown in FIG. 8.

In the open position, a sufficient gap is provided between the radiator and the oil cooler to let an operator spray water and air directly into the radiator's front surface or wall and the oil cooler's rear surface or wall to clean them out.

This hinge arrangement permits the radiator to be pivoted backward from the top, toward the rear of the vehicle. Radiator 112 is held in a closed position (FIG. 6) in which it is sealed against the air box rear end (e.g. against the rear edges of the air box frame members 230,232,234,236) by a latch member 300 that is fixed to the upper radiator frame. This first latch member 300 (FIG. 9) is releasably engaged by a second latch member 302 (FIG. 8) that is mounted on a metal plate 304 (shown with member 302 removed in FIG. 7) that, in turn, is welded to and between the horizontal top member 207 of heat exchanger support 206 and top frame member 230 of air box 228. In this latched position, the radiator is parallel to the oil cooler: the plane of the oil cooler is parallel to the plane of the radiator. The spacing between the radiator and the oil cooler is preferably between 0.5 and 2.0 inches when the radiator is in its closed, sealed and latched position.

When the latch member 300 is manually released, the radiator 112 and its frame can be pivoted backward from its closed position (shown in FIG. 6) to its open position (shown in FIGS. 8 and 9). The radiator 112 and hinge 294 are preferably arranged such that the radiator 112 can be pivoted to a its closed position of zero degrees with respect to the oil cooler (i.e. parallel to the oil cooler) in which it is spaced between 0.5 and 2.0 inches from the back of the oil cooler to an angle of at least ten degrees, preferably at least fifteen degrees, more preferably at least twenty degrees and most preferably at least thirty degrees with respect to the oil cooler. The degree of radiator pivoting is primarily a function of the length and orientation of the upper radiator coolant hose. The shorter the hose the less the radiator can be pivoted. Of course, removing the upper radiator heater hose will permit the radiator to be pivoted to an even greater angle.

When the radiator is in its closed position there is a substantially air-tight seal between the rear edges of air box frame members 230,232,234,236; and the edges of radiator 112 itself. Each rear edge of members 230,232,234,236 is covered with a flexible rubber seal or bead 306 (FIGS. 8, 9) that is fixed to the rear edge and faces backward, toward the radiator. When the radiator is tilted forward into position, this seal abuts the front face of the radiator within the radiator frame and prevents air from leaking out of the air box 228 before it goes through radiator 112. In this manner, all air that is driven into the air box 228 is forced first through oil cooler 113 and then through radiator 112.

When the latch is opened, however, the radiator tilts backward to the position shown in FIGS. 8 and 9, and the gap between the radiator and the oil cooler increases. This pivoting movement breaks the seal between the radiator and the seal 306, permitting cleaning agents such as air or water to be blown into the gap and the inner surfaces of the radiator and the oil cooler to be cleaned. Fixing the radiator back in its operating position merely includes pushing the radiator forward until latch member 300 and 302 engage and interlock.

The oil cooler has an oil cooler inlet and an oil cooler outlet. The inlet is a threaded hose fitting 308 (FIG. 10) located at the bottom of the cooler. This fitting extends through a hole 310 in the right side of air box frame member 232. A similar fitting 312 is disposed at the outlet of oil cooler 113. Fitting 312 is disposed in a slot 314 that is formed in top frame member 230 of air box 228.

To install the oil cooler, the operator first lowers the oil cooler into place abutting the bottom frame member 232, with fitting 308 sticking through hole 310. Once in this position, the operator tilts the oil cooler forward until the upper fitting 312 pivots into slot 314. At this point, the oil cooler is abutting the four tabs 254, 256, 258, 260 to which it is attached. The operator then inserts the threaded fasteners through the holes in the tabs and secures the oil cooler in place.

Figure 11:
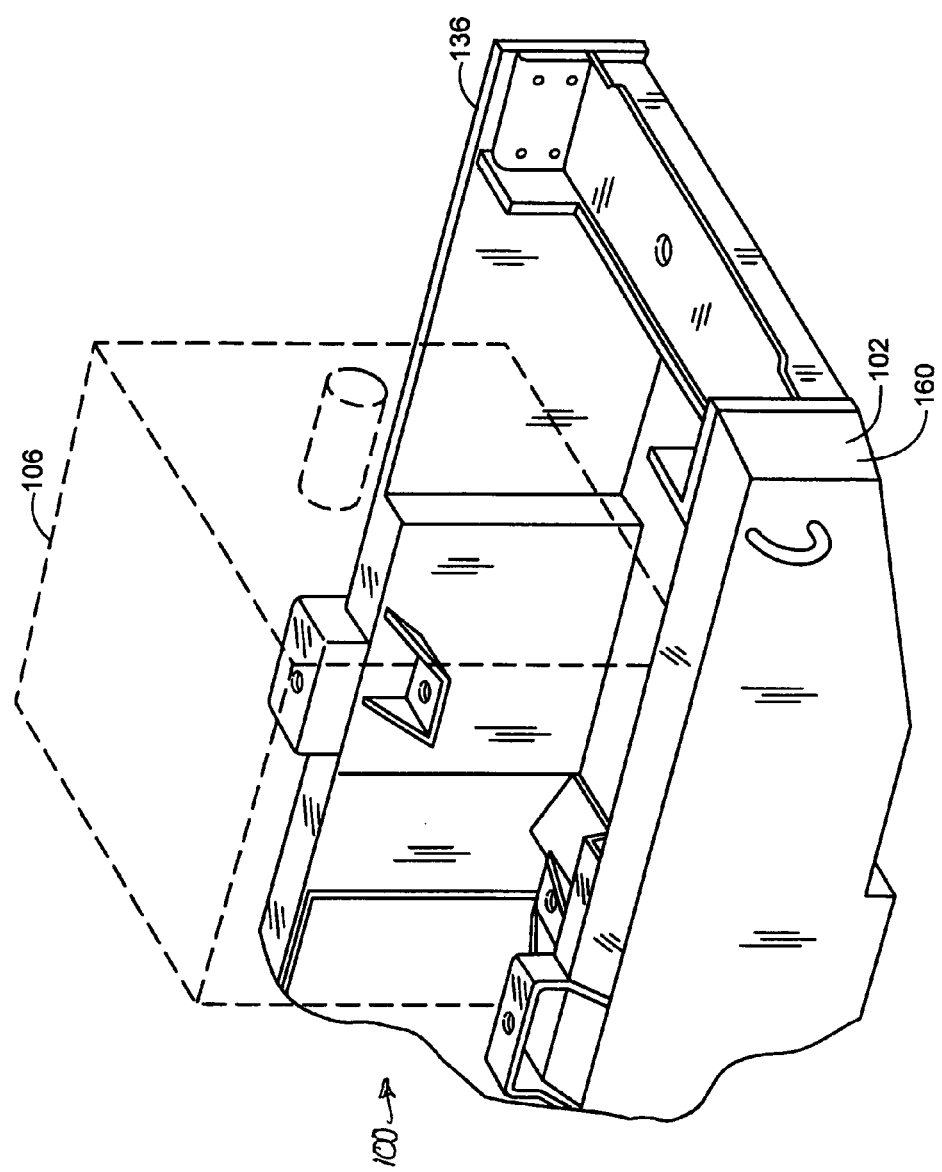
FIG. 11 illustrates the chassis arrangement of the vehicle. in particular, it shows the left side and right side longitudinally extending members that flank the engine and support the engine (shown as a rectangular block in phantom lines) as well as the radiator support assembly (not shown).

Radiator 112 similarly has two coolant connections—a coolant inlet and a coolant outlet—one located at the bottom of the radiator and one located at the top. The coolant connection located at the bottom includes a tubular member 316 (FIG. 10) that extends forward from a sidewall of the bottom tank 272. A flexible coolant hose 318 (FIG. 8) is fixed to member 316 and extends forward to engine 106 (FIGS. 1, 11) with which it is in fluid communication.

The other coolant connection, located at the top of the radiator, includes a tubular member 322 (FIG. 8) that extends forward from the front-facing sidewall of the top tank 268. Tubular member 322 is fixed to a flexible coolant hose 324 that extends between and is in fluid communication with the engine block 320 and the top tank of the radiator.

Coolant hose 324 extends forward from the radiator through an aperture 326 that is located on the right side of the heat exchanger support 206 above the top frame member 230 and below the top member 206. Once it passes through the aperture, it makes a sharp bend back to the left and extends laterally across the front of the heat exchanger support 206. From the left side of heat exchanger support 206 it turns again and extends forward and downward to engine 106 where it is attached By extending across in front of the top of the heat exchanger support 206, the upper coolant hose 324 is provided with sufficient slack to permit the radiator to be tilted backward away from the oil cooler.

When the radiator is tilted back out of the way, additional access to the space between the radiator and the oil cooler is provided by the arrangement of top panel 114 and door 110. Rather than extend straight across the rear of the engine compartment, top panel 114 is cut away in a central region of the rear top panel just above the radiator. As best shown in FIG. 6, this permits the operator to look directly downward onto the top of the radiator, and also to look directly downward on top of the gap between the radiator and the oil cooler when the radiator is tilted backward to permit access between the two. This cutaway region is not left open, however. The door 110 has a forwardly extending panel 326 that is affixed to the top of the door. This forwardly extending panel is configured to cover the cut away region 328 of top panel 114, thereby directing water and dirt away from the cutaway region and keeping the radiator dry.

As mentioned above, the door 110 of the vehicle 100 has several louvers 124 that are disposed adjacent to one another and extend laterally across an opening 122 in door 110. These louvers control the flow of air through the door, and thus also control the air through the oil cooler and the radiator. The louvers are surrounded by a frame 330 comprised of a top, bottom left and right elongated members 332,334,336,338. These members are fixed to each other at their ends to define a rectangular duct 340 approximately five inches long. Each of these members 332,334,336,338 has a flexible rubber bead or seal 342 that is fixed to their leading edges. These seals 342 seal the edges of members 332,334,336,338 to corresponding edges of radiator 112. The effect is to create, when the rear door 110 is closed, a single longitudinally extending and sealed air flow path that extends from the fan shroud plate through the oil cooler, then through the radiator, and finally through to the rear louvers on the rear door of the vehicle and back into the surrounding atmosphere.

This air flow path can be broken in two ways. First, the rear door can be unlatched and opened, which will break the seal between the rectangular duct 340 of door 110 and the back surface of radiator 112. Second, once the door is open and duct 340 pulled away from radiator 112, the radiator itself can be unlatched and tilted backward, breaking the seal between the radiator and the back of air box 228, thereby providing access to the forward surface of the radiator 112 and the rear surface of the oil cooler 113.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

We claim:

1. A method of opening a radiator mounting system of a skid steer vehicle for cleaning, comprising the steps of:
    opening a skid steer rear door containing a cooling air duct and pivoting a louvered rear door containing an air duct away from sealing engagement with the radiator;
    unlatching a radiator exposed by the opened rear door; and
    pivoting the unlatched radiator backward away from an oil cooler and pivoting the radiator about a pivotal axis disposed adjacent to a forward surface of a lower tank of the radiator.

2. The method of claim 1, wherein the step of pivoting the radiator about a pivotal axis disposed along a forward surface of a lower tank of the radiator includes the step of pivoting the radiator from a first position in which it is substantially parallel to an oil cooler and spaced behind the oil cooler with a gap therebetween, to a second position in which the radiator is disposed at an angle with respect to the oil cooler.

* * * * *